United States Patent
Shen et al.

(10) Patent No.: US 10,378,952 B2
(45) Date of Patent: Aug. 13, 2019

(54) OPTICAL DETECTING DEVICE CAPABLE OF PREVENTING ENVIRONMENTAL POLLUTION

(71) Applicant: PixArt Imaging Inc., Hsin-Chu (TW)

(72) Inventors: Chi-Chih Shen, Hsin-Chu (TW); Hung-Ching Lai, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 46 days.

(21) Appl. No.: 15/093,751

(22) Filed: Apr. 8, 2016

(65) Prior Publication Data

US 2017/0115159 A1   Apr. 27, 2017

(30) Foreign Application Priority Data

Oct. 26, 2015 (TW) .............................. 104135059 A

(51) Int. Cl.
*G01J 1/02* (2006.01)
*G01J 1/04* (2006.01)

(52) U.S. Cl.
CPC ........... *G01J 1/0214* (2013.01); *G01J 1/0271* (2013.01); *G01J 1/0488* (2013.01); *G01J 2001/0276* (2013.01)

(58) Field of Classification Search
CPC ...... G01J 1/0214; G01J 1/0271; G01J 1/0488; G01J 2001/0276; H05K 999/99
USPC ........................................ 250/216, 551, 239
See application file for complete search history.

(56) References Cited

U.S. PATENT DOCUMENTS

| 4,956,554 | A  | * | 9/1990 | Baker ...................... G01J 5/34 250/338.3 |
| 6,428,650 | B1 | * | 8/2002 | Chung ................ B29C 66/1224 156/250 |
| 6,888,120 | B2 | * | 5/2005 | Chiasson ............. B60H 1/0075 250/203.4 |
| 8,677,605 | B2 | * | 3/2014 | Lim ..................... H03K 17/941 29/595 |
| 8,810,866 | B2 | * | 8/2014 | Fujii .................... H04N 1/2346 250/216 |
| 2007/0034784 | A1 | * | 2/2007 | Tsai .................... H01L 31/0203 250/226 |
| 2009/0147215 | A1 | * | 6/2009 | Howell .................. G02C 11/00 351/158 |
| 2013/0032701 | A1 | * | 2/2013 | Chen ........................ H01J 3/14 250/216 |

(Continued)

FOREIGN PATENT DOCUMENTS

| CN | 101063909 A | 10/2007 |
| CN | 102017415 A | 4/2011 |
| CN | 201796875 U | 4/2011 |

(Continued)

*Primary Examiner* — Seung C Sohn
(74) *Attorney, Agent, or Firm* — Winston Hsu

(57) ABSTRACT

An optical detecting device capable of preventing environmental pollution includes a casing, an optical detecting component and a transparent component. The casing includes a light through unit and at least one accommodating structure. The optical detecting component is disposed inside the accommodating structure. The transparent component is disposed inside the accommodating structure and located above the optical detecting component, to partly fill the accommodating structure at least and block between the light through unit and the optical detecting component.

7 Claims, 2 Drawing Sheets

(56) References Cited

U.S. PATENT DOCUMENTS

2014/0084145 A1* 3/2014 Guan ................... G01S 7/4813
250/216
2016/0187483 A1* 6/2016 Luan .................... G01S 17/026
250/221

FOREIGN PATENT DOCUMENTS

CN 103151361 A 6/2013
TW 201403831 A 1/2014

* cited by examiner

OPTICAL DETECTING DEVICE CAPABLE OF PREVENTING ENVIRONMENTAL POLLUTION

BACKGROUND OF THE INVENTION

1. Field of the Invention

The present invention relates to an optical detecting device, and more particularly, to an optical detecting device capable of prevent environmental pollution.

2. Description of the Prior Art

The wearable device having water-proofing function, heat-proofing function and cold-proofing function is widespread applied to different weather and circumstances. An optical detecting device is disposed inside the wearable device to provide high-precision biological characteristic detection. However, the conventional optical detecting device does not have fine dust-proofing function, an optical detecting component of the optical detecting device is easily polluted by skin furfur, sweat, grease, ambient dust and/or suspension particle, noise is produced in optical detection information by the foresaid pollution, and precision of the optical detection information is affected accordingly. Thus, design of an optical detecting device capable of preventing the optical detection information from being interfered by the ambient dust and keeping low manufacturing cost and great assembly yield is an important issue in the related industry.

SUMMARY OF THE INVENTION

The present invention provides an optical detecting device capable of prevent environmental pollution for solving above drawbacks.

According to the claimed invention, an optical detecting device capable of preventing environmental pollution is disclosed. The optical detecting device includes a casing, an optical detecting component and a transparent component. The casing has a light through unit and at least one accommodating structure. The optical detecting component is disposed inside the accommodating structure. The transparent component is disposed inside the accommodating structure and located above the optical detecting component, and adapted to partly fill the accommodating structure at least and to block between the light through unit and the optical detecting component.

The optical detecting device of the present invention disposes the transparent component inside the casing, and the transparent component is located between the light through unit and the optical detecting component. While the transparent component is directly disposed on the optical detecting component in the substantial contact, the transparent component can prevent the dust falling into the casing via the light through unit from dropping over the optical detecting component, so as to avoid the ambient dust pollution. While the transparent component is suspended above the optical detecting component, the dust can be segregated and distant from the optical detecting component, the segregated distance is designed according to the thickness of the transparent component and/or an interval between the transparent component and the optical detecting component, so as to decrease interference of optical detection result while the ambient dust drops into the optical detecting device. Comparing to the prior art, the present invention can effectively prevent the detection quality of the optical detecting device from being interfered by the ambient dust, and provide preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
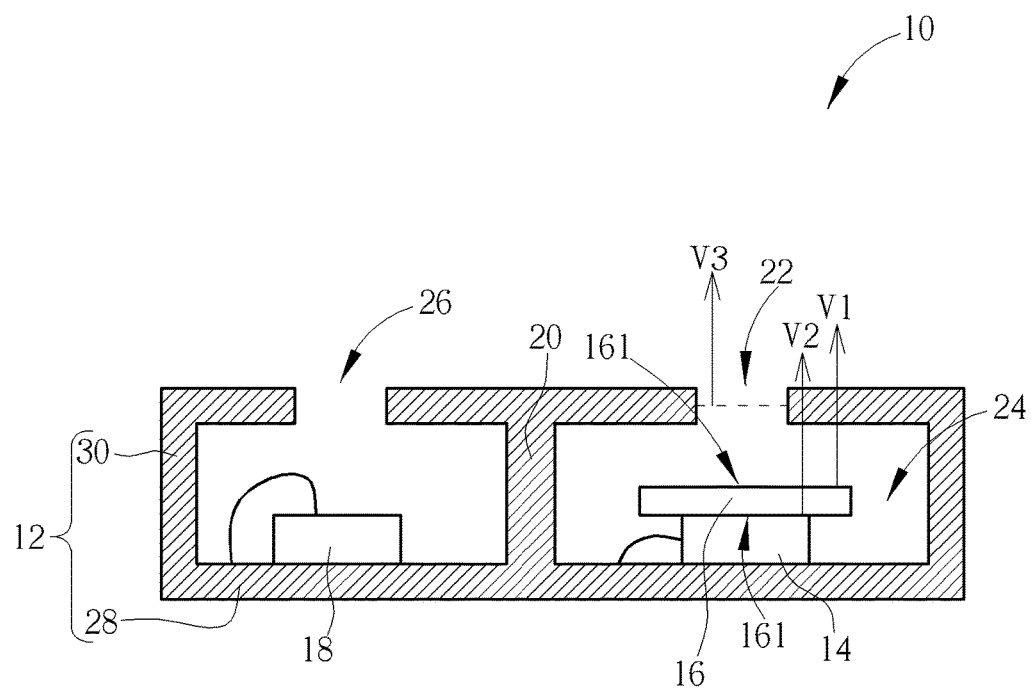
FIG. 1 is a structural diagram of an optical detecting device having a transparent component disposed on an optical detecting component according to an embodiment of the present invention.
Figure 2:
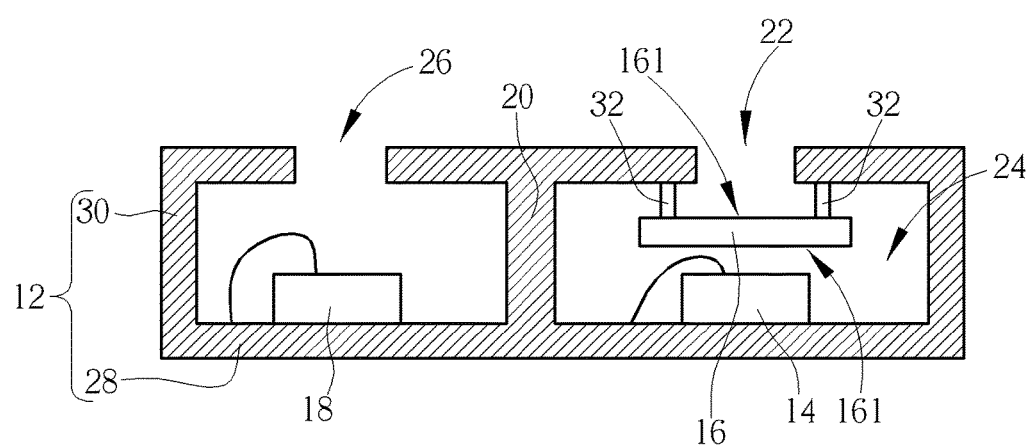
FIG. 2 is a structural diagram of the optical detecting device having the transparent component suspended above the optical detecting component according to the embodiment of the present invention.
Figure 3:
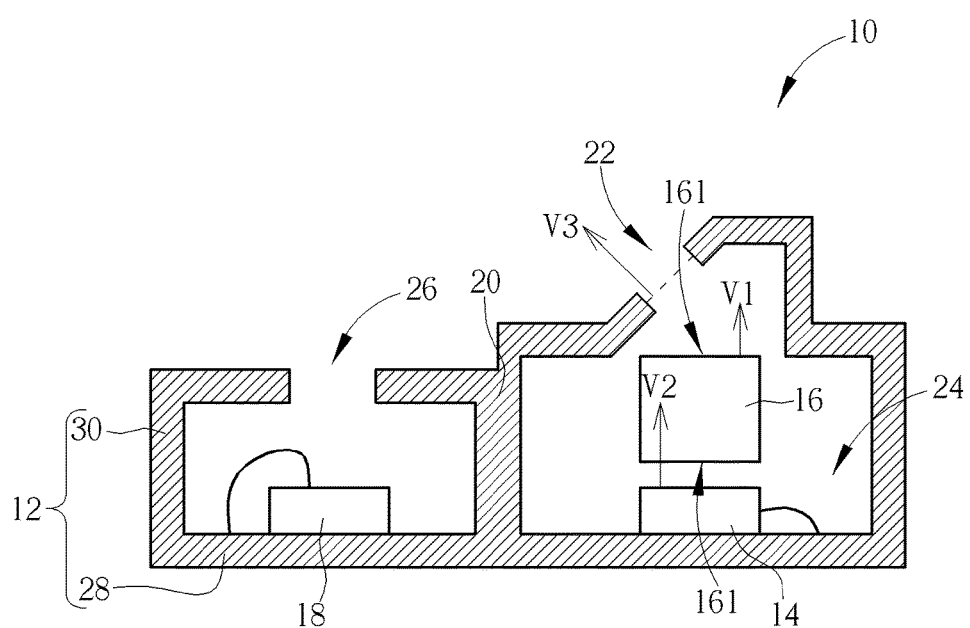
FIG. 3 is a structural diagram of the optical detecting device having an irregular casing according to an embodiment of the present invention.

Please refer to FIG. 1 to FIG. 3. FIG. 1 to FIG. 3 respectively are structural diagrams of an optical detecting device 10 according to different embodiments of the present invention. The optical detecting device 10 can be applied to a wearable device, such as the smart watch or the smart bracelet, for detecting biological characteristic information (such like information about the epidermal layer, the dermis layer and the vessel) of the wearer. The optical detecting device 10 includes a casing 12, an optical detecting component 14 and a transparent component 16, and further may include a light emitting component 18 and an isolating component 20 optionally. The casing 12 includes a light through unit 22 and an accommodating structure 24, and may have a light penetrating unit 26 according to design of the light emitting component 18. The casing 12 is mainly composed of a base 28 and a cover 30. A circuit board (which is not shown in figures) can be disposed on the base 28, and the optical detecting component 14 and the light emitting component 18 are electrically connected with the circuit board via wires. The cover 30 is disposed on the base 28 to surround the optical detecting component 14 and the light emitting component 18 for protection. The accommodating structure 24 is space formed between the base 28 and the cover 30. The light through unit 22 and the light penetrating unit 26 respectively are a light through hole and a light penetrating hole formed on the cover 30.

The optical detecting component 14 is disposed inside the accommodating structure 24 and located on a position corresponding to the light through unit 22, and the light emitting component 18 is disposed inside the accommodating structure 24 and located on a position corresponding to the light penetrating unit 26. The isolating component 20 is located between the optical detecting component 14 and the light emitting component 18, to prevent an optical signal of the light emitting component 18 from being received by the optical detecting component 14 before the optical signal is emitted out of the casing 12. The transparent component 16 is disposed inside the accommodating structure 24 and located above the optical detecting component 14. The accommodating structure 24 is partly filled with the transparent component 16, and the transparent component 16 is disposed between the light through unit 22 and the optical detecting component 14 for blocking the falling-dust path, so as to prevent the optical detecting component 14 from being polluted by external dust (which drops into the casing via the light through unit 22) or dirt already inside the casing 12. Therefore, the present invention can effectively protect the optical detecting component 14 against environmental pollution to keep stable and preferred detection quality of the optical detecting device 10.

Generally, a thickness of the transparent component 16 is preferably ranged between 50 μm and 1000 μm, which is designed according to dimensions of the casing 12 and placement of the transparent component 16. The transparent component 16 with greater thickness can directly contact against the light through unit 22, to prevent the dust from entering the casing 12 via the light through unit 22. The transparent component 16 with slight thickness can cover the optical detecting component 14, to prevent the dirt inside the casing 12 from dropping over the lens of the optical detecting component 14, so as to keep the preferred detection quality of the optical detecting component 14. In addition, the transparent component 16 may have filtering function about infrared radiation or ultraviolet radiation. For example, a light filtering layer can be formed on a surface of the transparent component 16, or the transparent component 16 is made of light filtering material. The filtering function of the transparent component 16 is not limited to the above-mentioned embodiments, which depends on design demand.

The optical detecting device 10 shown in FIG. 1 disposes the transparent component 16 directly on the optical detecting component 14 in substantial contact. However, in another embodiment shown in FIG. 2, the transparent component 16 can be suspended above the optical detecting component 14 by at least one connecting component 32. For example, the connecting component 32 may be a short rod, and two ends of the short rod are respectively connected to the transparent component 16 and the cover 30 of the casing 12; further, the connecting component 32 can be a wall structure surrounded around a contour of the light through unit 22, so as to fully fill intervals between the light through unit 22 and the optical detecting component 14. Structural variation of the connecting component 32 is not limited to the above-mentioned embodiments, and depends on actual demand.

The transparent component 16 can be a thin-typed optical component, which has two flat surfaces 161 substantially opposite to each other in parallel. As the embodiments shown in FIG. 1 and FIG. 2, a planar normal vector V1 of the flat surface 161 is substantially parallel to a detecting surface normal vector V2 of the optical detecting component 14 and a planar normal vector V3 of the light through unit 22. In another embodiment shown in FIG. 3, the cover 30 of the optical detecting device 10 has an irregular shape, which means the planar normal vector V1 of the flat surface 161 is substantially parallel to the detecting surface normal vector V2, but not parallel to the planar normal vector V3. The light through unit 22 (which protrudes from the cover 30) shown in FIG. 3 can be close to skin of the wearer for preventing noise interference by ambient illumination; accordingly, the transparent component 16 disposed inside the accommodating structure 24 has the flat surface 161 not parallel to the planar normal vector V3 of the light through unit 22. Inclination angle of the transparent component 16 relative to the casing 12 can be varied according to actual demand.

The transparent component 16 mentioned as above is an independent optical unit capable of being disposed on the detecting surface of the optical detecting component 14 or being suspended above the optical detecting component 14. Moreover, the optical detecting device 10 can fill sealant inside the accommodating structure 24, and the sealant is defined as the transparent component 16 for the dust proofing function. In manufacturing process of the sealant-typed transparent component 16, the liquid sealant is directly filled into the accommodating structure 24 (such as filling the liquid sealant into the accommodating structure 24 via the light through unit 22), the liquid sealant flows over the optical detecting component 14, then the liquid sealant is solidified and the solid sealant can provide the light penetrating function and the dust proofing function. Application of the transparent component 16 is not limited to the above-mentioned embodiment, and depends on design demand.

In conclusion, the optical detecting device of the present invention disposes the transparent component inside the casing, and the transparent component is located between the light through unit and the optical detecting component. While the transparent component is directly disposed on the optical detecting component in the substantial contact, the transparent component can prevent the dust falling into the casing via the light through unit from dropping over the optical detecting component, so as to avoid the ambient dust pollution. While the transparent component is suspended above the optical detecting component, the dust can be segregated and distant from the optical detecting component, the segregated distance is designed according to the thickness of the transparent component and/or an interval between the transparent component and the optical detecting component, so as to decrease interference of optical detection result while the ambient dust drops into the optical detecting device. Comparing to the prior art, the present invention can effectively prevent the detection quality of the optical detecting device from being interfered by the ambient dust, and provide preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device capable of preventing environmental pollution, the optical detecting device comprising:
   a casing, having a light through hole and at least one accommodating structure, the at least one accommodating structure inside the casing being exposed to an outside environment of the casing via the light through hole;
   an optical detecting component disposed inside the at least one accommodating structure; and
   a transparent component disposed inside the at least one accommodating structure and spaced from the optical detecting component and the light through hole so the light through hole is unsealed, the transparent component being pre-formed and adapted to partly and incompletely fill the at least one accommodating structure and to prevent dust falling into the casing via the light through hole from dropping over the optical detecting component.

2. The optical detecting device of claim 1, wherein a thickness of the transparent component is ranged between 50 μm and 1000 μm.

3. The optical detecting device of claim 1, wherein the transparent component comprises a light filtering layer, or the transparent component is made of light filtering material.

4. The optical detecting device of claim 1, wherein the transparent component is disposed on the optical detecting component in substantial contact, or the transparent component is suspended above the optical detecting component.

5. The optical detecting device of claim 1, wherein the transparent component comprises two flat surfaces substantially opposite to each other in parallel, planar normal vectors of the flat surfaces are parallel to a detecting surface normal vector of the optical detecting component, and not parallel to a planar normal vector of the light through hole.

6. The optical detecting device of claim 1, wherein the transparent component is sealant filled inside the at least one accommodating structure, or the transparent component is an independent unit disposed on a detecting surface of the optical detecting component.

7. The optical detecting device of claim 1, wherein the casing further comprises a light penetrating unit, and the optical detecting device further comprises:
    a light emitting component disposed inside the at least one accommodating structure and located on a position corresponding to the light penetrating unit; and
    an isolating component disposed between the light emitting component and the optical detecting component.

\* \* \* \* \*